US010388138B1

(12) United States Patent
Houser

(10) Patent No.: US 10,388,138 B1
(45) Date of Patent: Aug. 20, 2019

(54) REMOTE COMMUNICATION SAFETY BRACELET

(71) Applicant: Andrew I. Houser, Milan, OH (US)

(72) Inventor: Andrew I. Houser, Milan, OH (US)

( * ) Notice: Subject to any disclaimer, the term of this patent is extended or adjusted under 35 U.S.C. 154(b) by 0 days.

(21) Appl. No.: 16/244,165

(22) Filed: Jan. 10, 2019

Related U.S. Application Data

(63) Continuation of application No. 15/004,894, filed on Jan. 23, 2016, now abandoned.

(60) Provisional application No. 62/107,282, filed on Jan. 23, 2015.

(51) Int. Cl.

| | |
|---|---|
| ***G08B 21/02*** | (2006.01) |
| ***H04B 1/3888*** | (2015.01) |
| ***H04W 4/80*** | (2018.01) |
| ***B60Q 9/00*** | (2006.01) |
| ***H04B 1/3827*** | (2015.01) |
| *H04B 1/38* | (2015.01) |

(52) U.S. Cl.
CPC ............ *G08B 21/02* (2013.01); *B60Q 9/008* (2013.01); *H04B 1/385* (2013.01); *H04B 1/3888* (2013.01); *H04W 4/80* (2018.02); *H04B 2001/3866* (2013.01); *H04B 2001/3894* (2013.01)

(58) Field of Classification Search
CPC ...... G08B 21/02; B60Q 9/008; H04B 1/3888; H04W 4/008
USPC ...................................................... 340/539.11
See application file for complete search history.

(56) References Cited

U.S. PATENT DOCUMENTS

| | | | | |
|---|---|---|---|---|
| 9,230,419 B2 * | 1/2016 | Beggs | B60Q 1/2673 | |
| 9,311,827 B1 * | 4/2016 | Alqahtani | G09B 21/007 | |
| 9,317,155 B2 * | 4/2016 | Magi | G06F 1/1652 | |
| 2010/0142445 A1 * | 6/2010 | Schlicht | H04W 4/20 | 370/328 |
| 2011/0025492 A1 * | 2/2011 | Bravo | H04Q 9/00 | 340/539.11 |
| 2013/0181833 A1 * | 7/2013 | Al-Ali | A61B 5/7455 | 340/539.12 |
| 2015/0035672 A1 * | 2/2015 | Housley | G08B 21/0275 | 340/539.13 |
| 2015/0091716 A1 * | 4/2015 | Hathaway | B60Q 1/525 | 340/435 |
| 2015/0156581 A1 * | 6/2015 | Efrati | H02K 33/16 | 381/98 |
| 2015/0189056 A1 * | 7/2015 | Magi | G06F 1/1652 | 455/566 |
| 2016/0019817 A1 * | 1/2016 | Deokar | G08B 6/00 | 340/4.12 |

* cited by examiner

*Primary Examiner* — Omar Casillashernandez
(74) *Attorney, Agent, or Firm* — John D. Gugliotta

(57) ABSTRACT

A wearable signal notification device supports a proximity warning device that activates when identifying a back-up alarm within an identified risk proximity. When a signal is received, a vibratory motion is imparted to the band. The signal may be generated upon identification of a sound within an identified tone or frequency used by a backup alarm of a truck or other piece of moving equipment. When the tone or frequency is within an identified noise level the band will generate a vibratory tactile alarm. By reinforcing the back-up audible alarm on the moving equipment with vibration to a user, potential dangers will be better recognized when the wearer is in a risk area of the moving vehicle.

12 Claims, 6 Drawing Sheets

REMOTE COMMUNICATION SAFETY BRACELET

RELATED APPLICATIONS

The present invention claims benefit of U.S. Provisional Patent 62/107,282 filed on Jan. 23, 2015 and is a Continuation in Part of U.S. Ser. No. 15/004,894 filed on Jan. 23, 2016, both incorporated by reference as if fully rewritten herein.

BACKGROUND OF THE INVENTION

1. Field of the Invention

The present invention relates generally to "wearable" communication technology and, more particularly, to a bracelet capable of communicating in a non-audible manner in order to warn the wearer of moving dangers nearby.

2. Description of the Related Art

There are many environments where enhancing worker safety is desirable. Examples include construction sites in which pedestrian workers and heavy equipment may be simultaneously moving and commingling within a common space. Other examples exist in military applications, where foot soldiers and equipment must co-occupy a location where a loud ambient noise level may interfere with the awareness by each of surrounding risks. People and heavy, moving vehicles in these environments do not consistently interact in predictable ways as they do in other environments (e.g. on the street with defined lanes/roads for vehicles, sidewalks and crosswalks for pedestrians, stop signs, stop lights, etc.). Most construction vehicles include an audible safety warning that provide a sharp and distinctive beeping noise while operating in reverse, since it is in this direction that the vehicle operator has the least visibility and individuals in the area are at the greatest risk. Generally, a "back-up beeper" or an observer is required by OSHA for earthmoving vehicles with an obstructed view to the rear and no one on the ground to help guide the driver. Alarms are typically loud because manufacturers do not know the ambient noise level where the machines will be used.

The relevant OSHA regulation is 29 CFR Part 1926.601 (b)(4) which requires "a reverse signal alarm audible above surrounding noise level", but only when the motor vehicle has "an obstructed view to the rear". The determination of the noise level is left to the employer. However, because equipment is moved from place to place, the loudest alarms are often selected to overcome the maximum ambient noise or activity of common environments. However, even with such warnings ms these back-up alarms can themselves become either routine or part of the background noise such that even the audible warnings may be unheard or ignored. Back-up beepers are criticized by the public and in scientific literature due to concern that people become habituated to the ubiquitous noise, diminishing any effectiveness. Brains are not adapted for dealing with the repetitive and persistent sound of back-up beepers, but more towards natural sounds that dissipate. As such, the dangers of individuals being struck by construction vehicles, forktrucks, and similar and related accidents, are all too common.

Consequently, in order to gain the attention or otherwise communicate discretely with a person at risk in such an environment a system of nonauditory, tactile communication activated only in the proximity when sensing a risk is required.

SUMMARY OF THE INVENTION

It is a general object of the present invention to provide a non-audible communication system adapted for discrete personal use in communication with vehicles that pose a particular and distinct risk.

It is a feature of the present invention to provide wearable communication device adaptable for use bracelets, as well as with other wearable safety gear, such as hard hats, vests, or other future safety wearable items, and a system for communicating therewith, that is capable of delivering a non-audible indicia in response to incoming signals.

Briefly described according to the present invention, a wearable signal notification device supports a proximity warning device that activates when identifying a back-up alarm within an identified risk proximity. The wearable device may be configured as a wrist band, but may also be adapted for use in other wearable safety gear, such as hard hats, vest or other further safety wearable items. When a signal is received by the band, a vibratory motion is imparted to the band. The signal may be generated upon identification of a sound within an identified tone or frequency used by a backup alarm of a truck or other piece of moving equipment. When the tone or frequency is within an identified noise level, or determined to be increasing so to suggest the truck or other piece of equipment is moving toward a user, the band will generate a vibratory tactile alarm. By reinforcing the back-up audible alarm on the moving equipment with vibration to a user, potential dangers will be better recognized when the wearer is in a risk area of the moving vehicle.

Such reenforcement may result in prevention of a wearer ignoring an alarm signal due to habituation within the ambient environment.

Additional nonverbal communication to the wearer may further include differentiation in vibratory strength or pattern as an indicating of differences in either the type of risk or distance where the risk is presented relative to the bracelet.

It is therefore an advantage of the present invention to provide a new and improved wearable signal notification device and system that has all of the advantages of the prior art and none of the disadvantages.

It is a further advantage of the present invention to provide an inaudible signal notification means for people in environments where audible alarms may be inappropriate, infeasible or ineffective.

Another advantage of the present invention is to provide a wearable signal notification device that is waterproof, durable, and elastic and is thus suitable for use in strenuous physical activities.

Yet another advantage of the present invention is to alert users that a signal is being received by a mobile device without the need for the user to be in contact with the mobile device.

Still another advantage of the present invention is to incorporate an inaudible wireless notification device into a system for receiving notification of incoming signals.

Other objects, features and advantages of the present invention will become apparent from the following detailed description taken in conjunction with the accompanying drawings.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
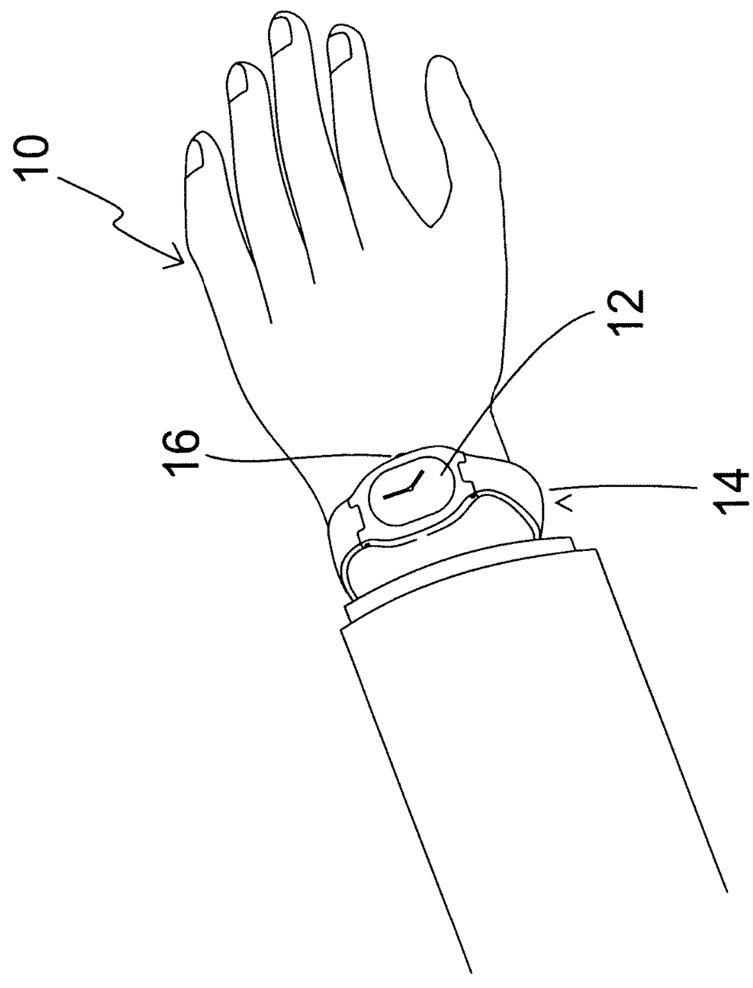
FIG. 1 is a perspective view of a remote communication bracelet according to the preferred embodiment of the present invention.

Referring now to FIG. 1, an article of the present invention is shown in the form of a notification signal device, generally noted as 10, in which a wireless communication receiver mechanism 12 is provided. As shown in conjunction with an exemplary preferred embodiment, an attachment band 14 allows for the notification signal device 10 to be wearable. It should be apparent to a person having ordinary skill in the relevant art, in light of the present teachings, that the receiver mechanism may alternately be incorporated in otherwise conventional safety gear, such as hard hats, vest, goggles or the like, or further still be incorporated into other further safety wearable items. The attachment band 14 is formed of a generally toroid shaped, waterproof, elastic strap member that is intended to attach to a user by circumscribing a user's limb such as to be in physical communication with the user. While FIG. 1 shows the band 14 attached about the wrist of a user, it should be understood that such an intended wearing position is merely exemplary and one having ordinary skill in the relevant art, in light of the present disclosure, would consider other wearing positions as being within the range of equivalents of the present invention. By way of example, and not as a limitation, such other wearing positions may include wearing about a user's ankle, placement in a user's pocket, attachment to a user's belt, or other similar alternate positions. As such, it should also be considered within the range of equivalents of the present invention that the band 14 be broadly defined as any attachment mechanism that functions to allow the wireless communication receiver mechanism 12 to be worn, carried or otherwise remain with the user.

Figure 2A:
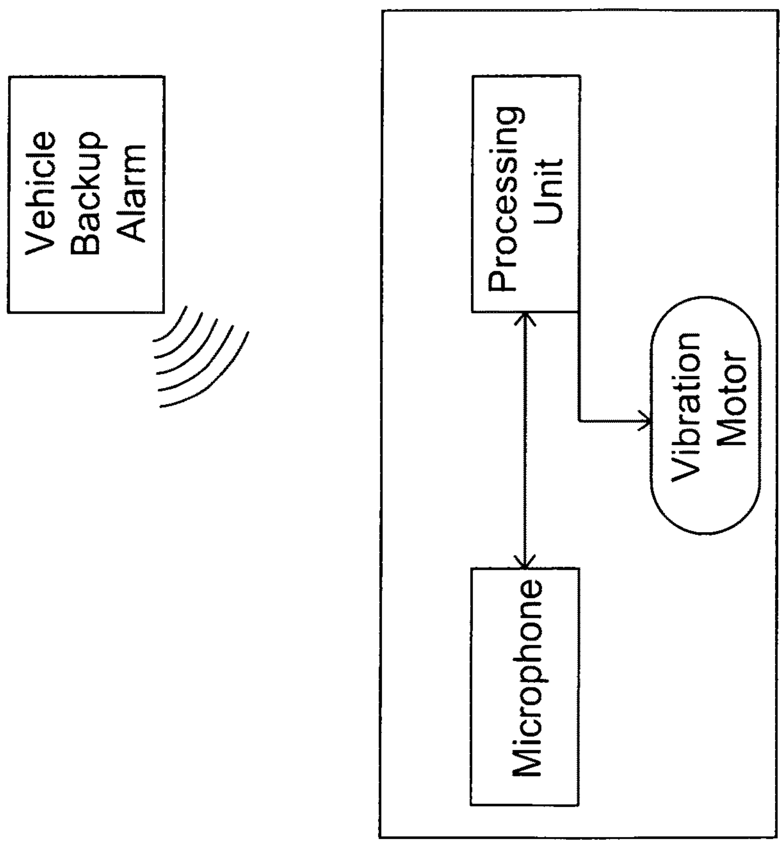
FIG. 2*a* is an exemplary block diagram for the system for use therewith.
Figure 2B:
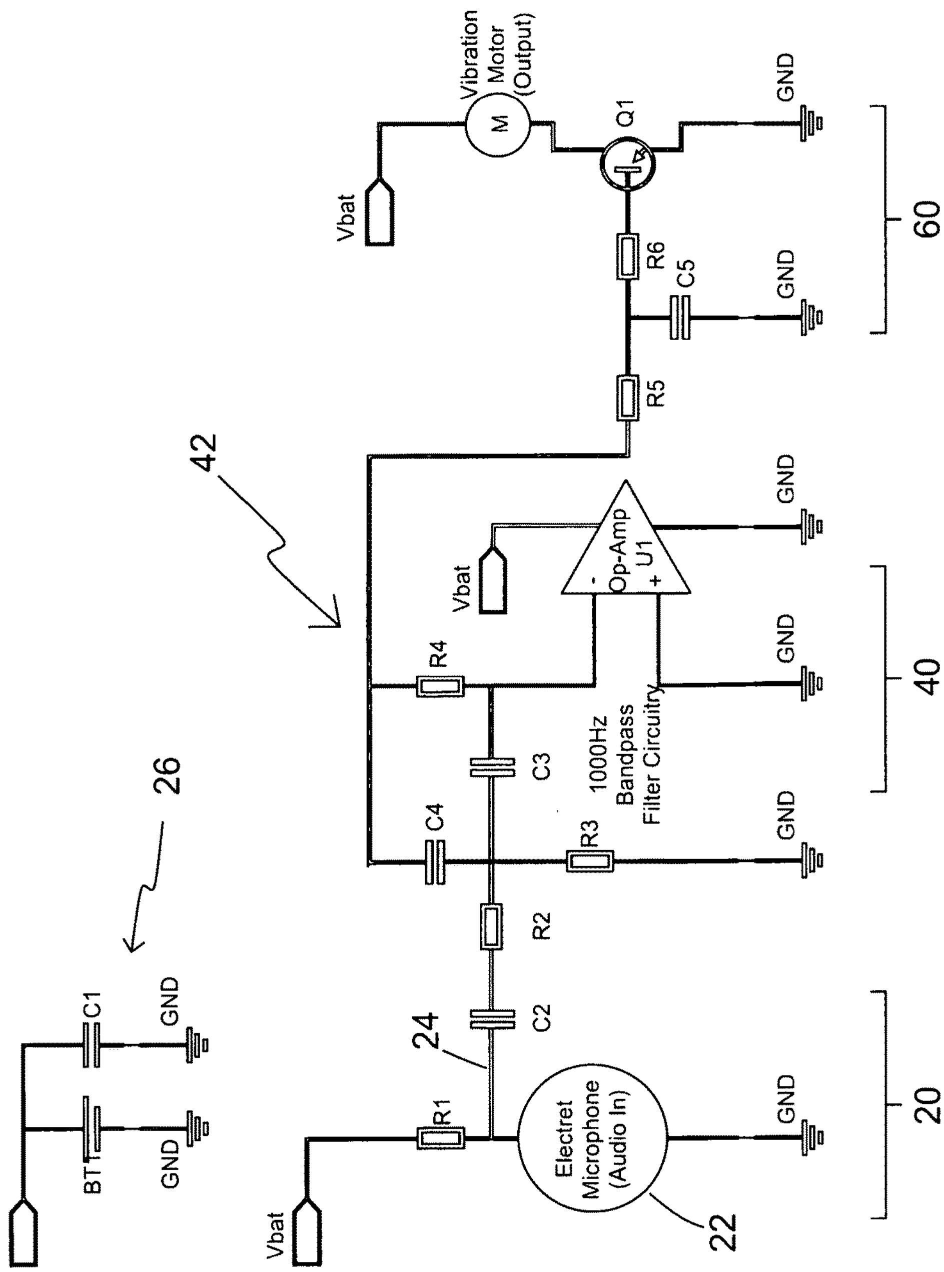
FIG. 2*b* is an exemplary electrical schematic for operation thereof.

Referring now in conjunction with FIG. 2*a* and FIG. 2*b*, inside the housing of the wireless communication receiver mechanism 12 is contained a microphone 20, a signal analyzer 40 and a mechanism for non-audible communication 60.

The microphone 20 provides an audio intake device to acquire ambient sound within a range about a wearer. The microphone 20 may be a conventional magnetic style. In a preferred embodiment the use of a solid state elctret microphone 22 may be provided utilizing a permanently polarized piece of dielectric material, analogous to a permanent magnet. Such an electret microphone may be an electrostatic capacitor-based microphone, which eliminates the need for a polarizing power supply by using a permanently charged material. In a preferred embodiment an electret microphones may use PTFE plastic, either in film or solute form, to form the electret. It should be understood by a person having ordinary skill in the relevant art, in light of the present teachings, such a configuration should be broadly construed within a broad scope of functional equivalents and could include, inter alia, a MEMS microphone, etc.

The signal analyzer 40 receives a sound input 24 from the microphone 22 for determination of a specific acoustic recognition. For purposes of the description, a running example is introduced whereby the signal analyzer 40 is provided to detect a vehicle back-up alarm generate by an approaching piece of moving equipments such as a truck, an excavator, or a fork lift for the express purpose of alerting nearby workers that the vehicle is approaching their location. Clearly, it will be understood that the teachings are extensible to implementation in detectors for a variety of other uses. If the acoustic input signal is identified as a selected pure-tone sound, it is then tracked to determine the identified sound is of a sufficient and increasing volume such as to indicate movement toward the user. Backup alarms typically produce 1000 Hz pure tone beeps at between 97-112 decibels. If the sound input is identified as a 1000 Hz pure tone, then the indication of a backing vehicle is determined. It should be understood that As shown in conjunction with FIG. 2*b*, the ambient audio signal is sense for the 1000 Hz signal by the electret microphone 22. A small 3.3V battery 26 (i.e., CR2032 coin cell or the like) with capacitor C1 (28) for a clean power supply. The microphone output 24 goes through capacitor C2 to couple only the AC waveform, thereby eliminating any DC offsets. A 1000 Hz bandpass filter 42 is created with Op-Amp U1 and R2, R3, C3, C4, and R4. This is a resonant circuit that would be calculated to be 1000 Hz center frequency. When the "beep" resonates with this part of the circuitry, the Op-Amp will send out a sine wave at 1000 Hz. The output of the Op-Amp is electrically smoothed out by C5. Except for a small charging and discharging window of time, C5 will turn on Q1, which in turn powers the vibratory motor. When the 1000 Hz signal goes away, C5 drains, Q1 turns off, and the vibration motor turns off.

While the above description is provided for an analog circuit embodiment in a basic form, it should be understood by a person having ordinary skill in the relevant art, in light of the present teachings, such a configuration should be broadly construed within a broad scope of functional equivalents and could include, inter alia, the us of a micro controller between the Op-amp and Q1 with some programmability (e.g., to add a series of small pulses to the motor, or to save battery and only listen for the backup signal 1/10 of the time, etc.). Additionally, a narrower band filter may be utilized to eliminate more frequencies, such as to accommodate the circuit actuation at 900 Hz, but with more in depth circuitry to allow to identify acoustic signals within 10 Hz of 1000 Hz. Such a range in specifications may further incorporate a means for tuning or setting the final circuit specification.

The mechanism for non-audible communication 60 may be any mechanism that causes vibration or other physical stimulus perceivable by the user. It is further envisioned that a visual mechanism, such as a modulated illumination, may be further actuated in conjunction with such vibration. While it is understood that the use of portable, personal mounted audible alarms may also be used in conjunction with non-audible alarming, it is felt that in the conditions and under the circumstances where the present invention is intended to be used that physical stimulus would provide benefits particular adapted to the environments of intended use. In either variant the alarm is actuated by a communication circuit module, a battery, and a user interface. While it is intended that the non-audible communication mechanism would include a vibration imparting mechanism for vibrating against the wrist of a wearer when activated, it should be apparent to a person having ordinary skill in the relevant art, in light of the present teachings, that additional non-vibratory mechanisms may be additionally or alternately utilized, such as, for example, a visual lighting mechanism such as one or more light emitting diodes. An antenna is connected to the communication circuit module, and while it is preferred that the antenna is an onboard antenna, the use of an antenna that extends from the inner band is possible, though not preferred. This antenna receives short range signals such as Bluetooth® or radio band signals. The communication circuit module may contain embedded logic configured to detect wireless signals within a predetermined frequency range and strength. While the use of such Bluetooth® or radio band signals is intended to be sufficient and exemplary, it should be understood that a variety of wireless communication mechanisms are capable of being used with the present invention. Referring to TABLE 1, a number of various types of wireless communication mechanisms are listed showing advantages, disadvantages and sensing mechanisms of each.

Upon detection of an incoming wireless signal, the communication chip's embedded logic activates an alert circuit causing the vibrator to vibrate the housing. In this way the bracelet provides both tactile feedback to a user whenever a signal of predetermined type is received. Alternately or additionally, the illumination of LED's may also be engaged as well.

In all parts of the invention the wearable article is an attachment mechanism containing the communication and alert electronics. If using a connection band or strap, the band may further provide an aesthetic appearance bracelet. Though the precise material, shape, and size can vary to suit the aesthetic desires of consumers, it is important that the band is durable and can accommodate differently sized users.

2. Operation of the Preferred Embodiment

Figure 3:
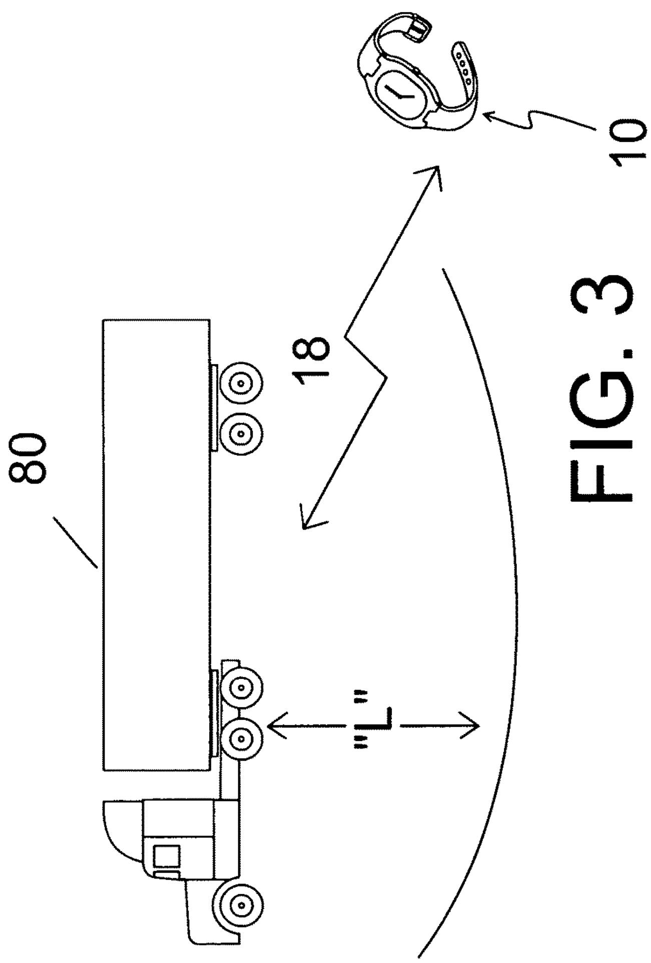
FIG. 3 is a schematic view according to the preferred embodiment of the present invention which remote communication bracelet is shown in use.
Figure 4:
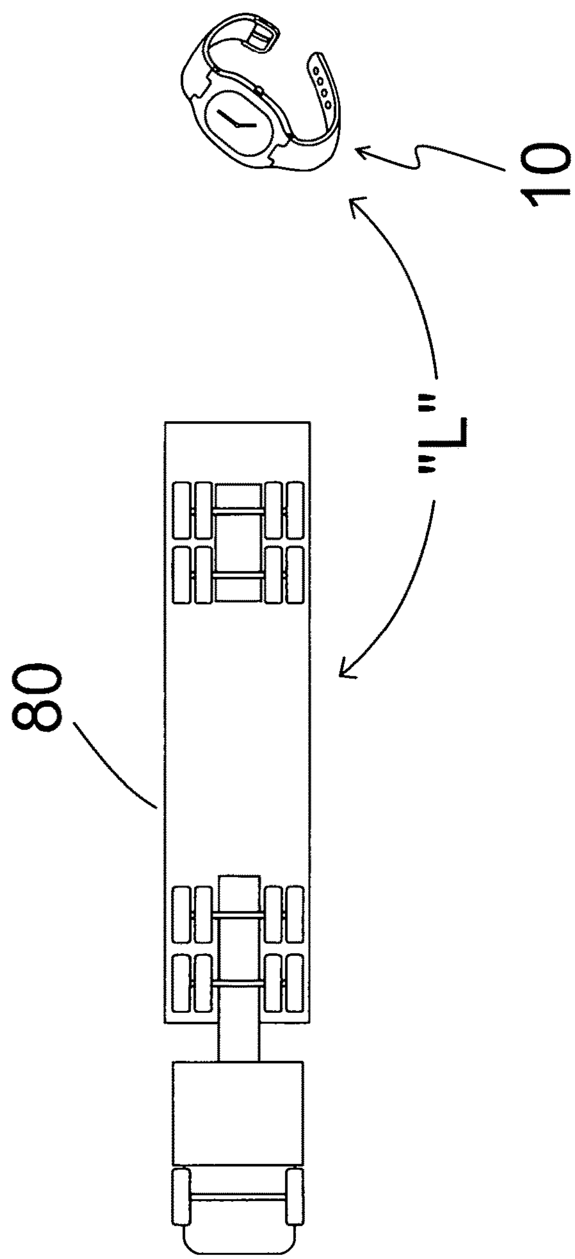
FIG. 4 is a top plan view according to the preferred embodiment of the present invention which remote communication bracelet is shown in use.
Figure 5:
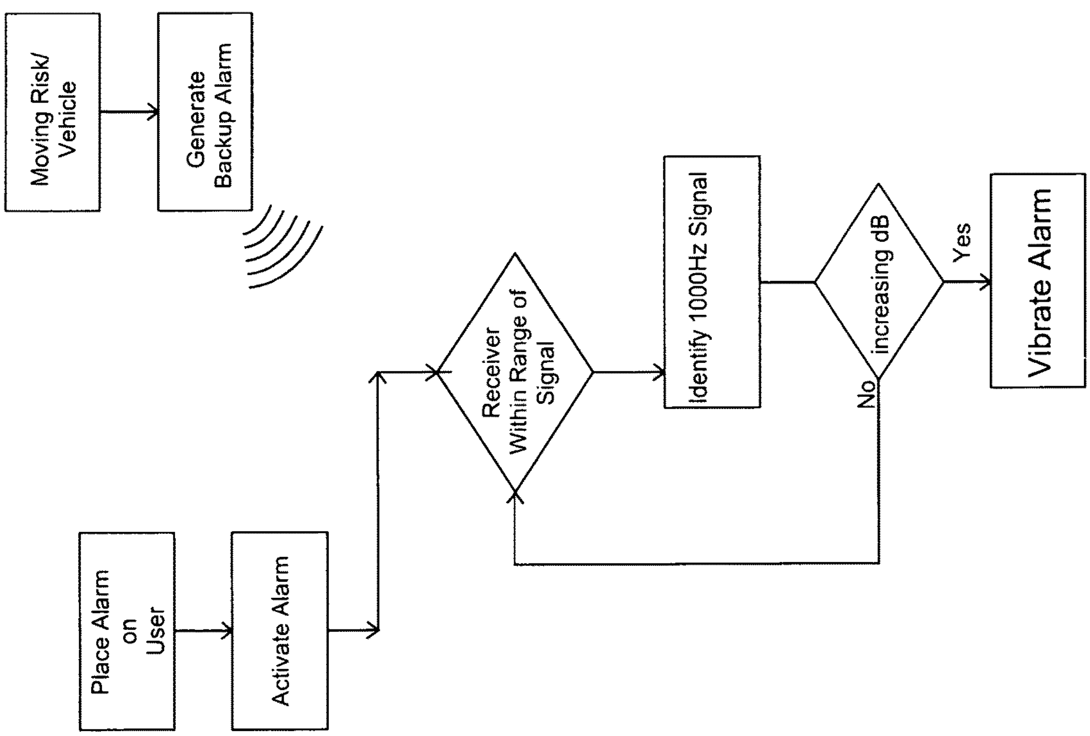
FIG. 5 is an block diagram outlining a general operation of the preferred embodiment.

Referring now in conjunction with FIG. 3-5, a wearable signal notification device according to the present invention is shown in use in which a wearable signal notification devices supports a proximity warning device that activates upon proximity with a particularized risk. The particularized risk shown herein is proximity to a piece of moving construction or military equipment operating within the same location as pedestrian cohorts, but such an examples should be interpreted as exemplary and not limiting in that the targeted risk may be specific and particularly associated with a target activity generally, and not merely limited to those risks associated with construction sites. Whatever the intended environment, when a signal is received by the band, a vibratory motion is imparted to the band. The band 12 is connected to and circumscribes a user's wrist. The user

TABLE 1

| Type | Advantages | Disadvantages | Sensing method |
|---|---|---|---|
| Infrared: passive | Good for long distance in fog. | Accuracy issues with heavy snow and rain. | Detects object or person presence by heat energy radiation. |
| Infrared: active | Good for long distance in fog. Measures vehicle speed. | Environmental concerns affecting accuracy include temperature, dust, and water sprays. | Emits laser beam to ground. Detects reduced time of reflection by objects in path. |
| Capacitive | Compact and easy to install. | Needs clean environment. | Detects change in capacitance due to object in detection zone. |
| Ultrasonic - pulse | Compact and easy to install. | All objects trigger alarm. Temperature, humidity, air turbulence, target surface smoothness, target size, angle of incidence, and external noise sources cause accuracy problems. | Detects change in time-of-flight reflection due to object in detection zone. |
| Radar: pulsed | Compact and easy to install. | All objects trigger the alarm. Snow and ice buildup and angle of incidence accuracy issue. | Measures time-of-flight of a pulse that is transmitted and then reflected off of objects in detection zone. |
| Radar: Doppler | Compact and easy to install. Measures vehicle speed. | Cannot detect stopped objects. Snow and ice buildup issues. | Detects a frequency shift in generated signal due to object in detection zone. |
| RFID: passive | Inexpensive and easy to install. | Generally short range. No range information. Orientation sensitivity. | A nonpowered tag detects generated radio signal. |
| RFID: active | Longer range than passive RFID. | Requires battery in tag. Orientation sensitivity. | A battery-powered tag detects generated radio signal. |
| GPS | Accurate; covers wide areas. | Only works on the surface. | A receiver detects satellite signals and triangulates position, transmits location to other vehicles/personnel via radio. |
| Video cameras | Simplicity. | Operator must observe monitor. Limited field of view. | Vehicle operator monitors objects in blind spots on cab-mounted monitor. |
| Magnetic: passive | Compact and easy to install. | Accuracy issues when metallic objects in field. | Detects change in Earth's magnetic field when objects enter detection zone. |
| Magnetic: active | Great accuracy over short distances. | Only receiver in detection zone triggers alarms. | A transmitter provides a marker signal. A receiver measures signal strength and provides alarms. |

may deactivate the communication signal though actuation of a control mechanism, shown herein as a user contacting a control button 16. It should be obvious to a person having ordinary skill in the relevant art and in light of the present teachings that such control mechanisms may vary within a broad range of equivalents of the present invention, and may include any number of interface mechanisms such as membrane buttons or other actuation implements within a variety of design selections as long as the control buttons allow for activation and deactivation of communication with another device 10. When an acoustic signal 18 within the target frequency range is received by the band 10, a vibratory motion is imparted to the band and felt by the wearer.

The signal 18 may be generated by a backup alarm of a truck or other piece of moving equipment 80. The signal is intended to be transmitted in a sufficiently short effective distance "L" that the microphone 20 in the band 10 will recognize the risk 80 when the wearer is in a risk area of the moving vehicle 80. It is intended that such is to provide a nonverbal communication to the wearer, and can included differentiation in vibratory strength or pattern as an indicating of differences in either the type of risk or distance where the risk is presented relative to the bracelet.

It is intended that such as to provide a nonverbal commination to the wearer, and can included differentiation in vibratory strength or pattern as an indicating of differences in either the intended message to be communicated, or differences in the source of the intended message. Additional controls allow for the user to transmitted a terminating signal back to the equipment hazard so as to shut off operation of the equipment and thereby prevent hazard to the pedestrian. Further still, feedback signals may additionally include a message by the wearer or otherwise providing a response or an acknowledgment to the sender.

The foregoing descriptions of specific embodiments of the present invention are presented for purposes of illustration and description. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company*, v. *Hilton Davis Chemical,* 520 US 17 (1997) or *Festo Corp.* v. *Shoketsu Kinzoku Kogyo Kabushiki Co.,* 535 U.S. 722 (2002), or other similar case-law or subsequent precedent should not be made if any future claims are added or amended subsequent to this Patent Application.

What is claimed is:

1. An alarm device for communicating in a non-audible manner in order to warn the wearer of moving dangers comprising:

a bracelet containing a receiver and capable of communicating in a non-audible manner in response to incoming signals, further comprising:

a microphone adapted for receiving audio intake of ambient sound within a selected range about a wearer;

a signal analyzer in communication with said microphone; and a mechanism for non-audible communication for providing tactile feedback to the bracelet upon initiation by the signal analyzer;

said signal analyzer capable of identifying audible backup alarm sounds generated by a backup alarm of a truck or other piece of moving equipment;

wherein said incoming signals are transmitted at a sufficiently short effective distance that said receiver in said bracelet recognizes a risk only when the wearer is in a risk area of the moving vehicle.

2. The alarm device of claim 1, wherein said microphone comprises a solid state electret microphone.

3. The alarm device of claim 2, wherein said electret microphones comprises a PTFE plastic, either in film or solute form, to form an electret.

4. The alarm device of claim 1, wherein said microphone comprises a MEMS microphone.

5. The alarm device of claim 3, wherein said signal analyzer is adapted for identify an ambient audio signal at 1000 Hz.

6. The alarm device of claim 5, wherein said signal analyzer further comprises:

a battery in series with a first capacitor in a manner to provide a power supply;

an output of the microphone output in electrical communication with a second capacitor to couple only an AC waveform in a manner eliminating DC offsets;

a 1000 Hz bandpass filter comprising:

an Op-Amp in communication with a resonant circuit to calculate a 1000 Hz center frequency and thereby generating a sine wave at 1000 Hz that is electrically smoothed by a second capacitor; and a vibratory motor powered by the sine wave after a charging and discharging window of time for turning the vibration motor on and off respectively.

7. The alarm device of claim 6, wherein said vibratory motor is adapted to provide nonaudible communication to the wearer via a differentiation in vibratory strength or pattern as an indicating of differences in either the type of risk or distance where the risk is presented relative to the bracelet.

8. A method of providing a non-audible communication signal to a wearer of a signal notification device of claim 7, comprising:

identifying a vehicle back-up audible alarm by the device of claim 7; and actuating a vibratory motion imparted to the bracelet.

9. The method of claim 8, wherein a nonverbal commination to the wearer is adapted to indicate a difference in either the intended message to be communicated, or a difference in the source of the intended message, said adaptation being selected from a group consisting of: differentiation in vibratory strength; changes in vibration pattern.

10. A method for increasing awareness between pedestrian workers an heavy equipment operating and commingling within a common operating space, the method comprising:

mounting onto at least one pedestrian worker an alarm device for communicating in a non-audible manner in order to warn the wearer of moving dangers comprising:

a microphone adapted for receiving audio intake of ambient sound within a selected range about a wearer;

a signal analyzer in communication with said microphone; and a mechanism for non-audible communication for providing tactile providing tactile feedback to the at least one pedestrian worker through the alarm device upon initiation by the signal analyzer;

receiving an audible backup alarm sound generated by a backup alarm of a truck or other piece of moving equipment;

filtering said audible backup alarm sound from other ambient noises; and initiating said tactile feedback when the filtered audible backup alarm sound is determined to be at a sufficiently short effective distance between the at least one pedestrian worker and a source of said audible backup alarm sound only when the wearer is in a risk area of the moving vehicle.

11. The method of claim 10, wherein said signal analyzer is adapted for identify an audible backup alarm sound at 1000 Hz.

12. The method of claim 11, wherein said signal analyzer further comprises:

a battery in series with a first capacitor in a manner to provide a power supply;

an output of the microphone output in electrical communication with a second capacitor to couple only an AC waveform in a manner eliminating DC offsets;

a 1000 Hz bandpass filter comprising:

an Op-Amp in communication with a resonant circuit to calculate a 1000 Hz center frequency and thereby generating a sine wave at 1000 Hz that is electrically smoothed by a second capacitor; and a vibratory motor powered by the sine wave after a charging and discharging window of time for turning the vibration motor on and off respectively.

* * * * *